US008087440B2

(12) United States Patent
Preisner et al.

(10) Patent No.: US 8,087,440 B2
(45) Date of Patent: Jan. 3, 2012

(54) EMBOSSING DEVICE

(75) Inventors: Mario Preisner, Kirchheim/Teck (DE); Michael Zinke, Limburg (DE)

(73) Assignee: manroland AG, Offenbach (DE)

( * ) Notice: Subject to any disclaimer, the term of this patent is extended or adjusted under 35 U.S.C. 154(b) by 1010 days.

(21) Appl. No.: 11/578,318

(22) PCT Filed: Apr. 13, 2005

(86) PCT No.: PCT/EP2005/003876

§ 371 (c)(1),
(2), (4) Date: Jan. 3, 2007

(87) PCT Pub. No.: WO2005/100035

PCT Pub. Date: Oct. 27, 2005

(65) Prior Publication Data

US 2007/0212490 A1 Sep. 13, 2007

(30) Foreign Application Priority Data

Apr. 13, 2004 (DE) ......................... 10 2004 018 306
Apr. 29, 2004 (DE) ......................... 10 2004 021 102

(51) Int. Cl.

| | |
|---|---|
| ***B65C 9/06*** | (2006.01) |
| ***B29C 63/02*** | (2006.01) |
| ***B29C 65/50*** | (2006.01) |
| ***B29C 65/56*** | (2006.01) |
| ***B65H 37/04*** | (2006.01) |
| *B29C 63/22* | (2006.01) |
| *B32B 37/14* | (2006.01) |
| *B32B 37/26* | (2006.01) |

(52) U.S. Cl. ......... 156/447; 156/446; 156/714; 156/715

(58) Field of Classification Search .................. 156/446, 156/447, 714, 715
See application file for complete search history.

(56) References Cited

U.S. PATENT DOCUMENTS

| | | | | |
|---|---|---|---|---|
| 3,858,977 A | | 1/1975 | Baird et al. | |
| 3,983,287 A | * | 9/1976 | Goossen et al. | 442/226 |
| 4,465,538 A | | 8/1984 | Schmoock | |
| 5,207,855 A | | 5/1993 | Nyfeler et al. | |
| 5,250,758 A | | 10/1993 | Fjelstad et al. | |
| 5,466,328 A | * | 11/1995 | Nagashima | 156/443 |
| 5,565,054 A | | 10/1996 | Lappe et al. | |
| 5,603,259 A | | 2/1997 | Gross et al. | |

(Continued)

FOREIGN PATENT DOCUMENTS

DE 831845 1/1952

(Continued)

OTHER PUBLICATIONS

English translation of EP1147893; Oct. 24, 2001.*

(Continued)

*Primary Examiner* — Sonya Mazumdar

(74) *Attorney, Agent, or Firm* — Leydig, Voit & Mayer, Ltd.

(57) ABSTRACT

The aim of the invention is to improve the supply of transfer foil in a coating module in which the image-forming layers of a transfer foil are transferred to a printing material. To achieve this, a partial pressing surface is located in the coating module for transferring the layers of the transfer foil. This permits targeted control of the foil feed. The transfer foil can be fed past a pressure cylinder in an approximately tangential manner and with a limited width.

16 Claims, 3 Drawing Sheets

U.S. PATENT DOCUMENTS

| | | | | | |
|---|---|---|---|---|---|
| 5,618,378 | A | | 4/1997 | Cahill | |
| 5,775,225 | A | | 7/1998 | Saitou | |
| 5,832,831 | A | * | 11/1998 | Boyle et al. | 101/375 |
| 5,891,289 | A | | 4/1999 | Zemel | |
| 6,395,120 | B1 | | 5/2002 | Bradbury-Harris et al. | |
| 6,779,442 | B2 | | 8/2004 | Strasser | |
| 6,811,863 | B2 | | 11/2004 | Rizika et al. | |
| 6,909,444 | B2 | | 6/2005 | Ishida et al. | |
| 8,011,411 | B2 | * | 9/2011 | Eitel et al. | 156/582 |
| 2007/0240590 | A1 | * | 10/2007 | Preisner et al. | 101/141 |
| 2007/0243322 | A1 | * | 10/2007 | Preisner et al. | 427/147 |
| 2007/0284047 | A1 | * | 12/2007 | Preisner et al. | 156/387 |
| 2010/0006234 | A1 | * | 1/2010 | Preisner | 156/540 |

FOREIGN PATENT DOCUMENTS

| | | | | |
|---|---|---|---|---|
| EP | 0148601 | A2 | | 7/1985 |
| EP | 0195857 | A2 | | 10/1986 |
| EP | 0414362 | A2 | | 2/1991 |
| EP | 0441596 | A1 | | 8/1991 |
| EP | 0569520 | | | 11/1993 |
| EP | 0945280 | A2 | | 9/1999 |
| EP | 1147893 | A2 | | 10/2001 |
| GB | 1574908 | | | 9/1980 |
| JP | 2004101834 | A1 | | 4/2004 |
| WO | WO 9212859 | A1 | | 8/1992 |
| WO | WO 9413749 | A1 | | 6/1994 |
| WO | WO 0234521 | A1 | | 5/2002 |
| WO | WO 2004041546 | A1 | | 5/2004 |
| WO | WO 2005021276 | A1 | | 3/2005 |
| WO | WO 2005100035 | A2 | * | 10/2005 |

OTHER PUBLICATIONS

"Prindor: Neue Technologie der Folienprägung—heriss oder kalt?", Deutscher Drucker, Deutscher Drucker Verlagsgesellschaft, Ostfildern, DE, Bd. 32, Nr. 14/15, Apr. 18, 1996, Seite G15, XP000584416 ISSN: 0012-1096 das ganze Dokument.

Walther T: "Offsetdruck and Folientransfer in nur einem Durchgang" Deutscher Drucker, Deutscher Drucker Verlagsgesellschaft, Ostfildern, DE, vol. 40, No. 15, Apr. 29, 2004, p. 42, 44, XP001196256 ISSN: 0012-1096, p. 42, col. 3, line 1-line 6.

Emeriau L: "La dorure est <<Vernie >> Grace Au Dispositif Speedor D'Ecamo, La Dorure A Froid Sur Presse Offset" Caractere, CEP Information Professions. Paris, FR, vol. 45, No. 387/388, Oct. 4, 1994, pp. 146-147, XP000476375 ISSN: 0247-039X, p. 147, col. 1, line 12-line 25.

* cited by examiner

EMBOSSING DEVICE

FIELD OF THE INVENTION

The invention pertains to a device and a method for transferring image-forming layers from a transfer foil to printing material.

BACKGROUND OF THE INVENTION

Producing metallic layers on sheets through a foil transfer method is known. For example, EP 0 569 520 B1 describes a printing material and a printing device that utilizes such a foil material. This reference relates to a sheet-fed machine with a feed unit and a delivery unit. Printing units and a coating module are arranged between the feed and delivery units. An adhesive pattern is applied using lithographic printing in at least one of the printing units. This adhesive pattern is applied with a cold printing method and has a certain design. A foil guide provided in the coating module is arranged downstream of the printing unit and features an impression cylinder and a press cylinder. This foil guide is designed such that a foil strip or a transfer foil can be guided from a foil supply roll through a transfer gap in the coating module between the impression cylinder and the press cylinder. The foil strip is rolled up again on the delivery side after it emerges from the coating module. The transfer foil features a carrier layer on which image-forming layers such as metallic layers (for example, made of aluminum) may be applied. A separation layer is provided between the metallic layer and the carrier foil. The separation layer ensures that the metallic layer can be removed from the carrier layer.

Each sheet is provided with an adhesive pattern as the sheets are transported through the printing unit. Subsequently, the sheet is guided through the coating module, in which the sheet lying on the impression cylinder is brought in contact with the foil material via the press cylinder. During this process, the metallic layer is arranged on the bottom and is tightly bonded to the areas of the sheet provided with the adhesive. As the sheet is transported, the metallic layer adheres only in the area of the adhesive pattern. As a result, the metallic layer is removed from the carrier foil in the area of the adhesive pattern. The consumed transfer foil is then rewound. The sheet is delivered in the coated state.

Utilizing coating modules of this type, for example, in printing units of printing machines is known. However, the disadvantage of these modules is that they cannot be flexibly utilized.

BRIEF SUMMARY OF THE INVENTION

In view of the foregoing, an object of the invention is providing a device that enables an image-forming layer, e.g., a metallic layer, to be transferred to a printing material in a more reliable, economical and precise manner. Thus, the device is also suitable for a broader spectrum of applications.

Advantageously, the device of the present invention includes a press cylinder having a pressing surface that occupies part of the total surface of a sheet. These pressing surfaces can be in the form of tensionable sections or coverings. Alternatively, the pressing surfaces can be in the form of partial rubber blankets, suitable photopolymeric printing plates or detachably mountable press segments (for example, magnetically mountable).

The device of the present invention can also be used to improve the utilization of foil by dividing the transfer foil into one or more narrow partial foil strips. This also can allow different foil types to be used concurrently.

To ensure that the coating method is carried out economically, the foil feed may be controlled such that the transfer foil is stopped when no image-forming or metallic layer is transferred. Advantageously, the transfer foil may be controlled such that the foil feed is stopped during the passage of a channel that accommodates the grippers of the sheet-guiding impression cylinder, with the press cylinder continuing to rotate in a sliding fashion underneath the transfer foil.

In order to improve the gloss, the image-forming layer can be applied using a so-called UV low-pressure ink. The UV low-pressure ink can be applied in the adhesive printing unit by means of an offset printing plate.

Advantageously, it is also possible to arrange several coating modules one after another in a sheet-fed machine. This allows different image-forming coatings or metallic layers within a particular design to be applied successively. In this case, it is possible to transfer the image-forming layers next to each other via a single adhesive pattern that contains all the image pattern elements. It is also possible to provide a first adhesive pattern with the first image-forming coating or metallic layer in a first coating module. Subsequently, another adhesive pattern can be applied over the first adhesive pattern. This second adhesive pattern can then be used to adhere another image-forming coating or metallic layer.

DETAILED DESCRIPTION OF THE INVENTION

Figure 1:
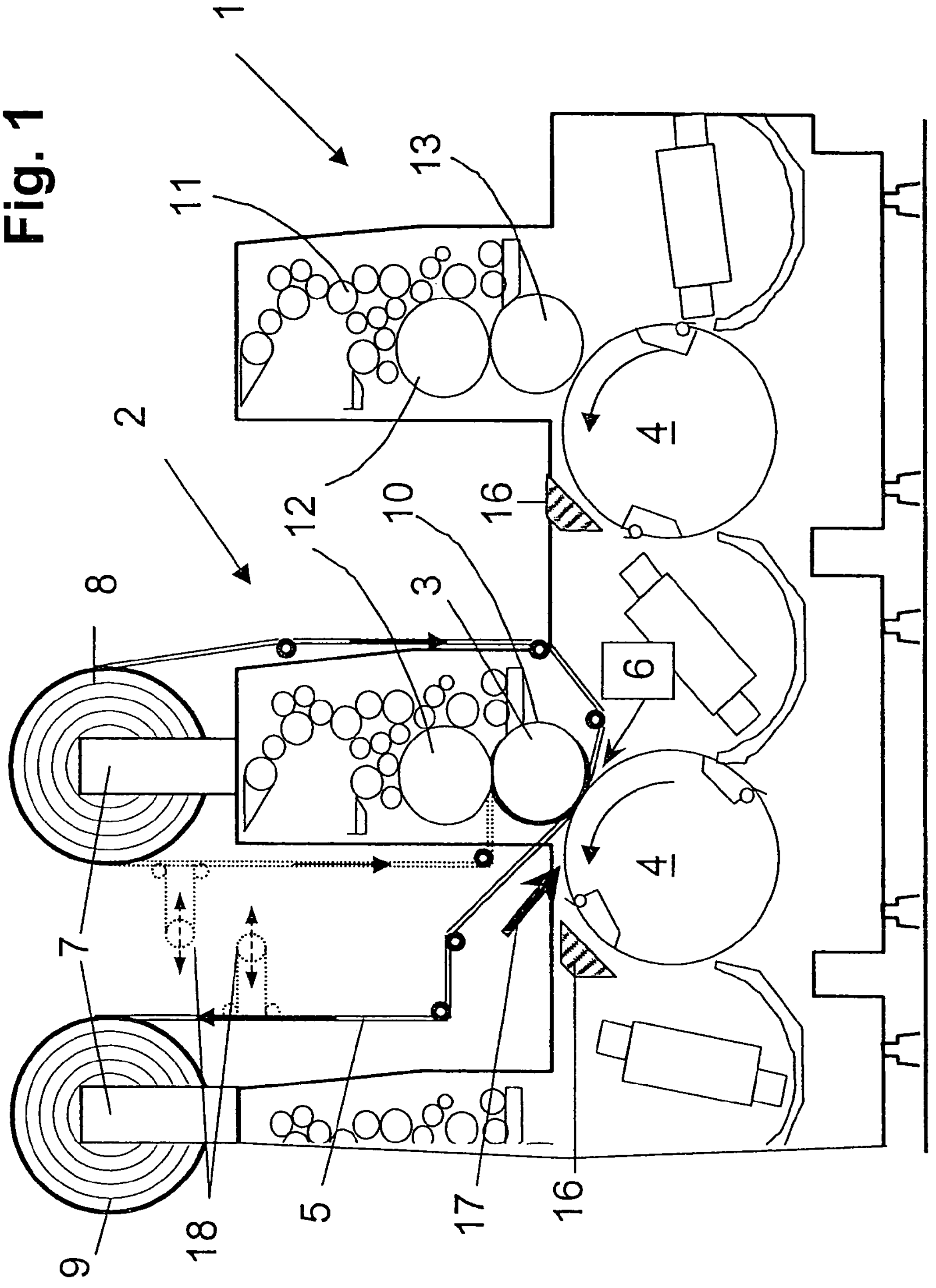
FIG. 1 is a schematic partial side sectional of an illustrative printing press having a foil transfer device according to the invention.

A sheet-fed or sheet-processing machine is shown in FIG. 1. In this case, the press comprises a printing press having at least two printing units. The two printing units can be used as discussed below to transfer an image-forming layer of a transfer foil to a printing sheet.

In a first step, a sheet to be coated is provided with an image-forming pattern of adhesive. The adhesive application is carried out in an application unit 1, e.g., a conventional printing unit of an offset printing machine. In this case, the application unit 1 includes inking and dampening units 11, a printing plate on a plate cylinder 12, an offset blanket or rubber blanket cylinder 13 and an impression cylinder 4. Units in the form of flexographic printing units or varnishing units can also be used.

In a second step, a transfer foil 5 is guided through a transfer gap 6 together with a printing sheet with the transfer foil 5 being pressed against the sheet. In this case, a coating module 2 is used that can correspond to a printing unit, a varnishing module, a base unit or another processing unit of a sheet-fed offset printing press. The transfer gap 6 in the coating module 2 is formed by a press cylinder 3 and an impression cylinder 4. In this case, the press cylinder 3 can correspond to an offset blanket cylinder and the impression cylinder 4 can correspond to an impression cylinder of a generally known offset printing unit. Furthermore, the press cylinder 3 can correspond to a plate cylinder and the impression cylinder 4 can correspond to an impression cylinder of a varnishing module of a sheet-fed printing machine. A so-called calendaring unit also can be arranged downstream of the coating module 2 if the coated sheet is to be rolled under increased pressure in order to increase the adhesion of the coating and improve the smoothness and gloss of the sheet.

A guide for the transfer foil 5 is provided within the coating module 2. Transfer foils 5 that can be used have a multi-layer construction. In particular, the transfer foils 5 can have a carrier layer, on which an image-forming layer is applied over a separation layer. The separation layer serves to ease removal of the image-forming layer from the carrier layer. The image-forming layer can consist, for example, of a metallic layer, a gloss layer, a textured layer, a colored layer, or a layer containing one or more image patterns.

A foil supply roll 8 is arranged on the sheet feed side of the coating module 2. The foil supply roll 8 features a controllable rotary drive 7. The rotary drive 7 can continuously control the feed of the transfer foil 5 to the coating module 2.

The region of the foil feed and delivery is provided with guiding devices 14 such as guide rollers or tensioning rollers, pneumatic guiding elements, baffle plates or the like. As a result, the web of the transfer foil 5 can always be guided in a flat, smooth and undistorted manner and at the same tension relative to the press cylinder 3. The guiding devices 14 can also include auxiliary elements for introducing the transfer foil 5. In this case, automatic draw-in or insertion aids for the web of the transfer foil 5 also can be used. In this way, the foil feed in the area of various protective elements 15 surrounding the coating unit 2 is simplified. The protection function of the protective elements 15 is also completely preserved.

In the illustrated embodiment, the transfer foil 5 can be guided around the press cylinder 3, with the transfer foil 5 advantageously being transported to and from the press gap 6 on only one side of the coating module 2 (see the broken lines in FIG. 1). Advantageously, unlike as shown in FIG. 1, the foil strips also can be guided close to one another in a parallel fashion in the incoming and outgoing segments depending on the available space on one side of the coating module 2. In another embodiment, the transfer foil 5 can also be guided to and from the press gap 6 such that the transfer foil extends past the press cylinder 3 in a substantially tangential manner or the transfer foil can be wrapped around a small circumferential angle of the press cylinder. In this case, transfer foil 5 can be fed on one side of the coating module 2 with the delivery taking place on the opposite side of the coating module 2.

The foil collecting roll 9 is provided on the delivery side of the printing unit. The used foil material is rewound on the foil collecting roll 9. In this case, a controllable rotary drive 7 also can be provided to optimize production. The transfer foil 5 also could be transported on the delivery side via the rotary drive 7 and could be held taut by a brake on the feed side. In this context, the foil control could also include the tension rollers 18 described below.

For the image-forming layer transfer process, e.g., transferring a utility layer from the transfer foil 5 to the printing sheet in the transfer gap 6 between the press cylinder 3 and the impression cylinder 4, it is important that the surface of the press cylinder 3 (i.e., the offset blanket or plate cylinder) be equipped with a compressible dampening element. To this end, the press cylinder 3 can be provided with a press covering 10 or can comprise a cylinder with a corresponding coating. For example, the press covering 10 or press coating can comprise a plastic coating that is comparable to a rubber blanket or offset blanket. The surface of the press covering 10 or press coating is preferably very smooth. The surface of the press covering or coating can also consist of non-adhesive substances or structures. For example, a relatively hard structure in the form of very fine spherical segments could be used. The press covering 10 is held on the press cylinder 3 via clamping devices or grippers provided in a cylinder channel.

To improve the transfer characteristics in the transfer gap 6, the press covering 10 can have a specific elasticity. This elasticity can be achieved using a compressible intermediate layer. This compressibility is preferably similar to or less than that of conventional rubber blankets or offset blankets used for this purpose. This compressibility also can be achieved by a conventional compressible offset blanket. In addition, a covering consisting of a combination of a hard offset blanket on a soft underlayer can be used. A limited pressing surface may also be provided directly on the press cylinder 3 or on the press covering 10. This pressing surface can be machined in the surface of the press covering 10 or it can be fixed on the press cylinder 3 in the form of a partial surface of the material of the press covering 10.

Figure 3:
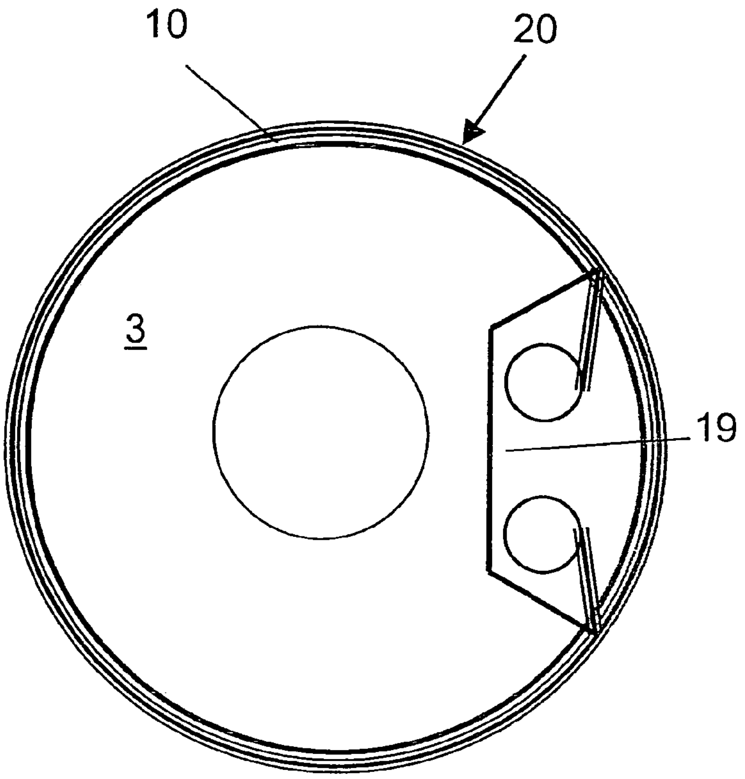
FIG. 3 is a schematic side sectional view of the press cylinder of the coating module of FIG. 2.
Figure 4:
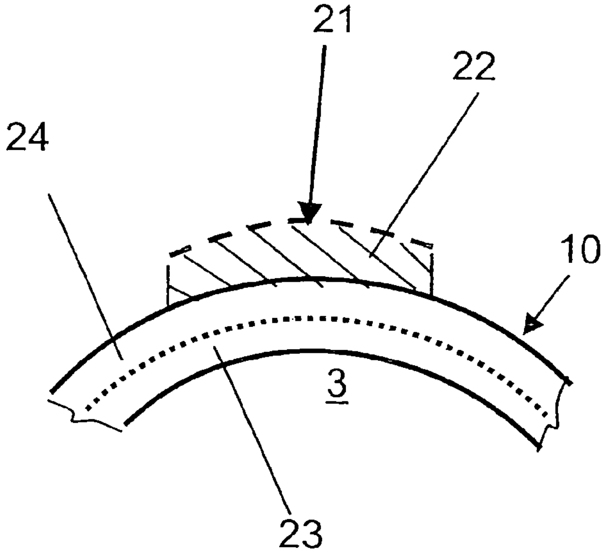
FIG. 4 is an enlarged side sectional view of a portion of the press cylinder of FIG. 3.

To improve the economic efficiency of the coating process, the feed of the transfer foil 5 from the foil supply roll 8 to the transfer gap 6 and then to the foil collecting roll 9 can be controlled such that the advance of the transfer foil 5 is substantially stopped when no transfer of the image-forming layer is taking place. In this case, the advance of the transfer foil 5 can be controlled such that the foil feed is stopped during the passage of a gripper channel of the sheet-guiding impression cylinder 4. The grippers hold the printing sheet on the impression cylinder 4. The press cylinder 3 has a corresponding cylinder channel 19 (see FIG. 3), in which the press covering 10 is held. In the area of the corresponding cylinder channels, the transfer foil 5 is not pressed between the press cylinder 3 (offset blanket cylinder) and the impression cylinder 4. Instead, the press cylinder 3 continues to rotate in a sliding fashion on the transfer foil 5 while the transfer foil 5 is left not touching anything between the press cylinder 3 and the impression cylinder 4. This state continues until the so-called print start of the cylinder channel 19 ends and the transfer foil 5 is once again clamped between the press cylinder 3 and the impression cylinder 4 together with a printing sheet. The transport of the transfer foil 5 then resumes. The cycling of the foil feed may begin and end slightly earlier than defined by the channel edges of the cylinder channel so as to take into account any required acceleration and deceleration of the foil supply roll 8 and the foil collecting roll 9. In quickly reacting cycling systems using so-called tension rollers 18 such as in FIG. 1, control of the respective rotary drives 7 of the foil supply roll 8 and the foil collecting roll 9 may not be required. In such a case, the required foil tension can also be maintained with the aid of the tension rollers 18.

A further improvement in the utilization of the foil can be achieved by dividing the transfer foil 5 into one or more partial foil strips of narrow width. If each foil strip is controlled accordingly with the aid of any devices for cycling the foil feed, the utilization of the transfer foil 5 can also be improved in instances in which the lengths of the coating regions within a sheet vary in the different zones to be coated. Each partial foil strip is only transported in a precise manner in only those regions where the image-forming surface layer should be applied. In the regions that should remain uncoated, each partial foil strip can be stopped independently of the other partial foil strips such that unnecessary foil consumption is prevented.

In order to further improve the coating process, a dryer 16 could be provided in the area of the adhesive application and in the area of the foil application. In this case, the applied adhesive pattern can be pre-dried with a first dryer 16 (intermediate dryer I) using a UV drying process in order to improve the adhesion of the image-forming utility layer of the transfer foil 5. The adhesion of the image-forming utility layer on the printing sheet can be further improved with a second dryer 16 (intermediate dryer II) that further accelerates the drying of the adhesive.

The quality of the coating can be inspected after the foil application by an inspection or monitoring device 17. In this case, the inspection device 17 can be directed toward a sheet-guiding surface of the coating module 2 downstream of the transfer gap 6 and, if applicable, sealed off from the dryer 16. Alternatively, the monitoring device can be directed toward a sheet-guiding surface of another sheet-guiding module arranged downstream of the coating module 2. A sheet passing this inspection device is checked with respect to the completeness and quality of the coating. Sheets determined to be flawed can be marked or sorted out as waste in a sorting device.

Figure 2:
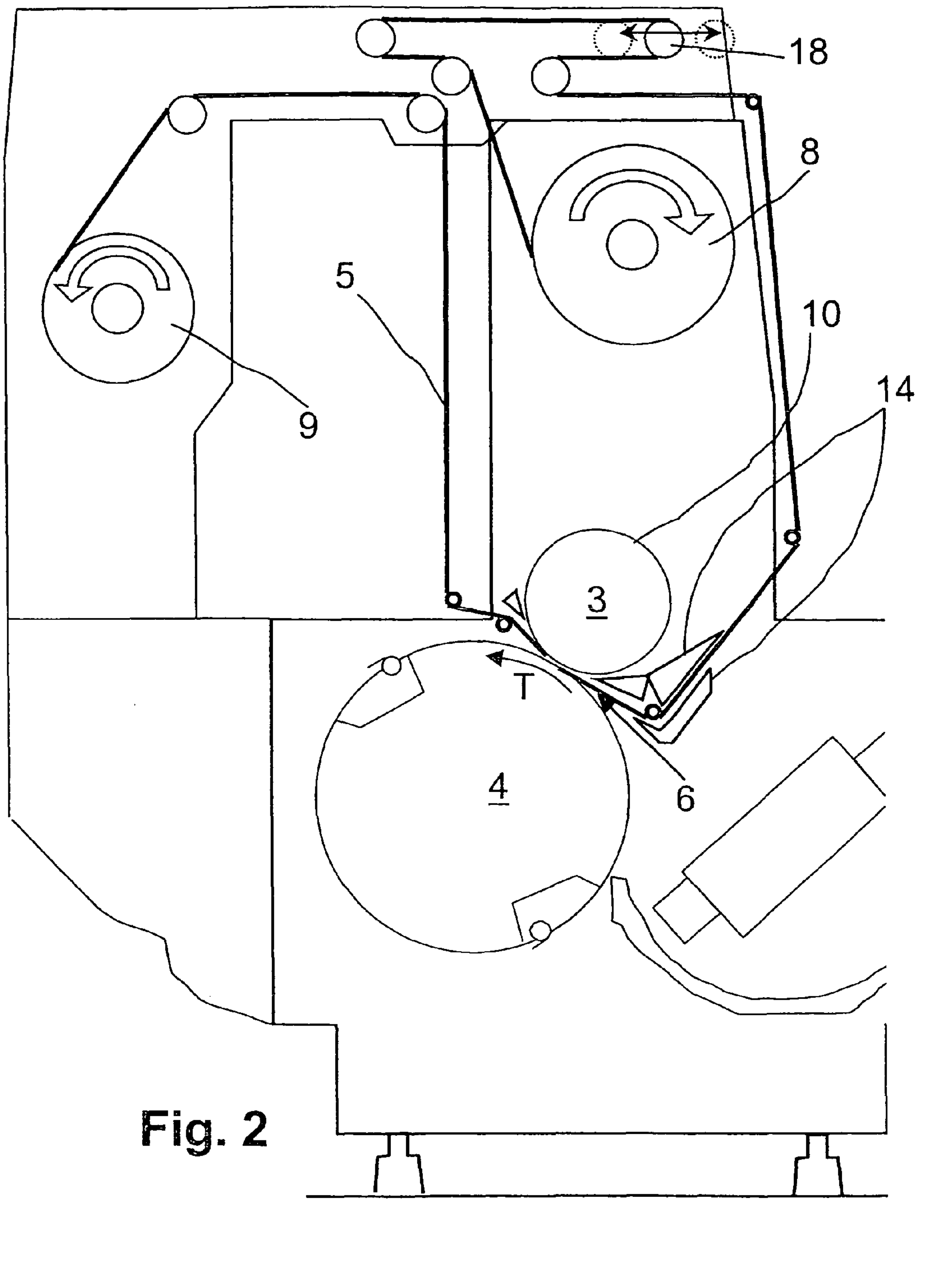
FIG. 2 is a schematic partial side sectional view of the coating module of the printing press of FIG. 1.

To improve the layer transfer and the ultimate finished coating, the coating module can be provided with devices for conditioning the transfer foil as shown in FIG. 2. In this case, the foil strip 5 can be influenced by the foil guiding device 14.

According to one particular embodiment of the invention, the surface of the press cylinder 3 consists of a contoured, delimited or partial pressing surface 21. In this case, a partial pressing surface 21 of the press cylinder 3 that is limited to one or more regions is used rather than a complete pressing surface 20. The partial pressing surface 21 can be in the form of an isolated surface element, an annular, narrow surface element wrapped around the press cylinder 3, a surface element extending over the width of the press cylinder 3 that follows a surface line and covers a limited circumferential section or in the form of several surface elements of this type. For example, a partial offset blanket, an imageable plastic printing plate or a pressing segment 22 that carries the partial pressing surface 21 and preferably is detachably fixed on a smooth underlayer via bonding or magnetic attraction can be used for this purpose. A pressing segment 22 with a magnetic surface on its underside can be directly attached to the surface of the press cylinder 3. Alternatively, a magnetic foil can be affixed to the surface of the press cylinder 3. The partial pressing surface 21 is then attached and positioned by affixing a pressing segment 22 with a magnetic underside on the magnetic foil. The surface and the internal structure of the pressing segment 22 should correspond to the aforementioned details with respect to elasticity and smoothness. In this case, a compressible substrate 23 may be provided that carries a preferably smooth and relatively rigid functional layer 24.

Similar to the passage of the cylinder channel 19, the function of this partial pressing surface 21 is to ensure that the transfer foil 5 will only be clamped when the partial pressing surface 21 passes through the transfer gap 6 while contacting the transfer foil 5. In other words, the pressing surface 21 should only act upon the transfer foil 5 where image-forming layers are actually to be transferred from the transfer foil 5 to the sheet. This makes it possible to produce two effects in the coating module. First, the transfer foil 5 feed can be initially stopped when the area to be coated lies somewhere within the image area of the sheet and has not yet reached the area of the partial pressing surface 21 or the area of the partial pressing surface 21 ends before the end of the sheet region to be coated. Therefore, the transfer foil 5 only needs to be transported when the partial pressing surface 21 is engaged between the press cylinder 3 and the impression cylinder 4 within the transfer gap 6. This makes it possible to utilize almost the entire transfer foil 5 between the sheets to be coated. When using an annular pressing surface 21, the foil transport is only stopped during the channel passage. When using a pressing surface 21 having a single or multiple. segments that are as wide as the cylinder and extend over part of its circumference, the foil feed also can be stopped during the passage of circumferential surfaces of the press cylinder 3 that do not carry a segment.

An additional improvement in the utilization of the foil is produced by dividing the transfer foil 5 into one or more partial foil strips of narrow width. This is particularly advantageous in connection with the partial pressing surface 21. With the partial pressing surface 21, the transfer foil 5 can be limited to the width of the pressing surface 21. This substantially reduces foil consumption. The guidance of the foil in the transfer gap 6 is significantly improved due to the complete contact between the narrow strip of the transfer foil 5 and the partial pressing surface 21 in at least the transfer gap 6.

Through appropriate control of each foil strip via the device or devices for cycling the foil feed, the utilization of the transfer foil 5 can be improved if the lengths of the coating areas within a sheet differ in the respective zones. This is achieved by only transporting each partial foil strip in the precise area in which the image-forming surface layer needs to be applied. In the regions that should remain uncoated, each foil strip can be stopped independently of the other foil strips in order to prevent unnecessary foil consumption.

Different foil types can also be used concurrently in combination with the aforementioned method in order to produce surfaces that have a different foil color or a different smoothness or structure.

LIST OF REFERENCE SYMBOLS

1 Application unit
2 Coating module
3 Press cylinder
4 Impression cylinder
5 Transfer foil/foil strip
6 Transfer gap
7 Reel drive
8 Foil supply roll
9 Foil collecting roll
10 Press covering
11 Inking/dampening units
12 Plate cylinder
13 Offset blanket/rubber blanket
14 Foil guiding device
15 Printing unit protection
16 Dryer
17 Inspection device/monitoring system
18 Tension roller
19 Cylinder channel
20 Pressing surface
21 Partial pressing surface
22 Pressing segment
23 Substrate
24 Functional position

The invention claimed is:

1. A device for transferring an image-forming layer from a transfer foil to a printing sheet in a sheet fed rotary printing press comprising:

a supply of transfer foil having a multi-layer structure including a carrier layer and an image forming layer, an application unit for coating a side of the printing sheet with an adhesive pattern;

a coating module for transferring the image-forming layer from the transfer foil to the printing sheet, the coating module including an impression cylinder and a press cylinder that define a transfer gap therebetween;

a transfer foil feeding device for feeding the transfer foil to the coating unit and for delivering the transfer foil from the coating unit, the transfer foil feeding device including a drive for transporting the transfer foil in a working direction;

a transfer foil guiding device for guiding the transfer foil through the transfer gap with the carrier layer in contacting relation to the press cylinder under pressure through the transfer gap with the coated side of the printing sheet in contact with the image forming layer of the transfer foil such that the image forming layer is transferred to the adhesive pattern on the printing sheet;

said impression cylinder having a sheet gripper channel;

said press cylinder having a covering with an outer surface in the form of fine spherical segments for preventing adhesion of the covering surface to said transfer foil, and said transfer foil feeding device being operable for controlling the feed of the transfer foil such that the feed of the transfer foil is stopped when said sheet gripper channel of the impression cylinder passes the transfer gap and the image forming layer of the transfer foil is not to be transferred in the transfer gap while the press cylinder continues to rotate in sliding fashion with the transfer foil while maintaining contact with the transfer foil.

2. The device according to claim 1 wherein the press cylinder has an outer cylindrical surface with an elevated pressing surface having a contoured outline and a size limited to a maximum area of the printing sheet to be coated.

3. The device according to claim 1 wherein a press cover element is arranged on a cylindrical surface of the press cylinder in a precisely fitted fashion relative to the printing sheet and wherein the press cover element includes an elevated pressing surface contoured in accordance with the region of the printing sheet to be coated.

4. The device according to claim 3 wherein the press cover element comprises a pressing segment that is detachably mounted on the press roller and is sized in accordance with a region of the printing sheet to be coated.

5. A device for transferring an image-forming layers from a transfer foil to a printing sheet comprising:

a supply of transfer foil having a multi-layer structure including a carrier layer and an image forming layer;

an application unit in the form of a printing unit of an offset printing press for coating the printing sheets with an adhesive pattern;

a coating module in the form of a printing unit of an offset printing press for transferring the image-forming layer from the transfer foil to the printing sheet, the coating module including an impression cylinder and a press cylinder that define a transfer gap therebetween, a transfer foil feeding system for guiding the transfer foil through the transfer gap in substantially tangential relation to the press cylinder with the press cylinder forcing the image forming layer of the transfer foil against the printed sheet such that the image-forming layer is transferred to the printing sheet;

said impression cylinder having a sheet gripper channel;

the transfer foil feeding system including a drive for transporting the transfer foil in a working direction; and said transfer foil feeding system controlling the feed of the transfer foil such that the feed of the transfer foil is stopped when said sheet gripper channel of the impression cylinder passes the transfer gap and the image forming layer of the transfer foil is not to be transferred to the printing sheet in the transfer gap of the coating unit while the press cylinder continues to rotate in sliding fashion with the transfer foil while maintaining contact with the transfer foil.

6. The device according to claim 5 wherein the partial foil strips are provided with different image-forming layers.

7. The device according to claim 5 wherein the press cylinder includes an elevated pressing surface having a contoured outline and a size limited to a maximum area of the printing sheet to be coated.

8. The device according to claims 5 wherein a press cover element is arranged on a surface of the press cylinder in a precisely fitted fashion relative to the printing sheet and wherein the press cover element includes a pressing surface contoured in accordance with the region of the printing sheet to be coated.

9. The device according to claim 8 wherein the press cover element comprises a pressing segment that is detachably mounted on the press roller and is sized in accordance with a region of the printing sheet to be coated.

10. The device according to claim 1 in which said press cylinder is a blanket cylinder.

11. The device according to claim 1 in which said press cylinder is a plate cylinder.

12. The device according to claim 1 in which said press cylinder covering is compressibly deformable.

13. The device according to claim 5 in which said transfer foil guiding device directs said transfer foil through said transfer gap in substantially tangential relation to the press cylinder.

14. A device for transferring an image-forming layer from a transfer foil to a printing sheet comprising:

an application unit for coating the printing sheet with an adhesive pattern;

a coating module for transferring an image-forming layer from the transfer foil to the printing sheet, said coating module including an impression cylinder and a press cylinder that define a transfer gap therebetween, a transfer foil feeding system for feeding the transfer foil to the coating unit and for delivering the transfer foil from the coating unit, the transfer foil feeding system including a drive for transporting the transfer foil in a working direction;

said transfer foil being guidable through the transfer gap together with the printing sheet with the image-forming layer of the of the transfer foil facing the printed sheet, said press cylinder having elevated pressing segments that are selectively positionable and releasably carried on the press cylinder for defining predetermined pressing faces corresponding to the adhesive pattern applied to the printing sheet by the application unit for transferring the image forming layer of the transfer film only to the adhesive pattern of the printed sheet directed through the transfer gap; and a transfer foil guiding device for controlling the feed of the transfer foil such that the feed of the transfer foil is stopped when the image-forming layer of the transfer foil is not to be transferred to the printing sheet in the transfer gap of the coating unit.

15. The guiding device according to claim 14 in which said pressing segments are bonded to the surface of the press cylinder.

16. The device according to claim 14 in which said pressing segments are magnetically affixed to the surface of the press cylinder.

* * * * *